United States Patent
Kim

[19]

[11] Patent Number: 5,995,133
[45] Date of Patent: Nov. 30, 1999

[54] METHOD FOR CHANGING A RATING CODE WITH A MACRO FUNCTION KEY AND RECEIVING APPARATUS HAVING A FUNCTION FOR BLOCKING OUT A PROGRAM

[75] Inventor: Seong-Ouk Kim, Seoul, Rep. of Korea

[73] Assignee: Daewoo Electronics Co., Ltd., Seoul, Rep. of Korea

[21] Appl. No.: 09/191,339

[22] Filed: Nov. 13, 1998

[30] Foreign Application Priority Data

Jun. 29, 1998 [KR] Rep. of Korea ...................... 98-25198

[51] Int. Cl.$^6$ ...................................... H04N 7/16
[52] U.S. Cl. ........................ 348/5.5; 348/10; 340/825.03; 340/825.04; 340/825.35
[58] Field of Search ................................ 348/5.5, 1, 4, 7, 348/9, 10, 460, 461, 465, 473, 474, 476, 553, 563, 569, 570, 725, 732, 731, 734, 906; 340/825.35, 825.03, 825.04

[56] References Cited

U.S. PATENT DOCUMENTS

| | | |
|---|---|---|
| 4,554,584 | 11/1985 | Elam et al. . |
| 4,605,964 | 8/1986 | Chard . |
| 4,888,796 | 12/1989 | Olivo, Jr. . |
| 4,930,158 | 5/1990 | Vogel . |
| 4,930,160 | 5/1990 | Vogel . |
| 5,172,111 | 12/1992 | Olivo, Jr. . |
| 5,195,135 | 3/1993 | Palmer . |
| 5,270,822 | 12/1993 | Choi . |
| 5,387,942 | 2/1995 | Lemelson . |
| 5,485,518 | 1/1996 | Hunter et al. . |
| 5,550,575 | 8/1996 | West et al. . |
| 5,569,366 | 10/1996 | Chen et al. . |
| 5,583,576 | 12/1996 | Perlman et al. . |
| 5,719,618 | 2/1998 | Park .......................................... 348/5.5 |
| 5,737,479 | 4/1998 | Fujinami . |
| 5,758,258 | 5/1998 | Shoff et al. ............................... 455/5.1 |

*Primary Examiner*—Andrew I. Faile
*Assistant Examiner*—Alexander Berhe
*Attorney, Agent, or Firm*—Pillsbury Madison & Sutro LLP

[57] ABSTRACT

A received television program is blocked out when a rating of the program is not within a scope of a preset rating. The preset rating code can be easily changed with a macro function key. A function of the macro function key is registered, and a rating code corresponding to the registered macro function key is read out. The read-out rating code is compared with a preset rating code. If the read-out rating code is within the scope of the preset rating code, the preset rating code is replaced with the read-out rating code. Otherwise, a user is requested to input user's identification. When the user inputs the user's identification, this user's identification is compared with a registered identification. If the inputted user's identification is identical to the registered identification, the preset rating code is replaced with the read-out rating code. The macro function key can give the user convenience in setting a blocking-out rating code.

5 Claims, 11 Drawing Sheets

| MACRO FUNCTION KEY | ID | SET GRADE |
|---|---|---|
| V+1 | 123 | TV-PG |
| V+2 | 234 | NC-17 |
| V+3 | 345 | TV-14 |
| V+4 | 456 | X |

```
▷ PARENTAL GUIDE        : OFF
  TELEVISION GUIDELINES
  BLOCK PROGRAMS ABOVE : TV-G
  MOTION PICTURE GUIDELINES
  BLOCK PROGRAMS ABOVE :  G

UNRATED PROGRAMS      : BLOCK

SET ACCESS CODE
  MACRO FUNCTION KEY    : ON

△▽: SELECT  ◁▷: CHANGE  ■: EXIT
```

| RATING | (ALL) | FV | V | S | L | D |
|---|---|---|---|---|---|---|
| TV-MA | X |  | X | X | X |  |
| TV-14 | X |  | X | X | X | X |
| TV-PG | X |  | X | X | X | X |
| TV-G | X |  |  |  |  |  |
| TV-Y7 | X | X |  |  |  |  |
| TV-Y | X |  |  |  |  |  |

△▽ ◁▷ : MOVE CURSOR
NUMBER 0 : CHANGE STATUS
■ : PREVIOUS MENU   X : BLOCKED

HELP MESSEGE

| | FV | V | L | S | D |
|---|---|---|---|---|---|
| TV-Y<br>ALL CHILDREN | | | | | |
| TV-Y7<br>FOR CHILDREN AGE 7 AND ABOVE | MILD FANTASY OR COMEDIC VIOLENCE | | | | |
| TV-G<br>GENERAL AUDIENCE | | | | | |
| TV-PG<br>PARENTAL GUIDANCE SUGGESTED | | MODERATE VIOLENCE | INFREQUENT COARSE LANGUAGE | SOME SEXUAL SITUATIONS | SOME SUGGESTIVE DIALOGUE |
| TV-14<br>PARENTS STRONGLY CAUTIONED (UNSUITABLE FOR CHILDREN UNDER 14 YEARS OF AGE) | | INTENSE VIOLENCE | STRONG COARSE LANGUAGE | INTENSE SEXUAL SITUATIONS | INTENSELY SUGGESTIVE DIALOGUE |
| TV-MA<br>MATURE AUDIENCE ONLY (UNSUITABLE FOR CHILDREN UNDER 17) | | GRAPHIC VIOLENCE | CRUDE INDECENT LANGUAGE | EXPLICIT SEXUAL ACTIVITY | |

FIG. 13

| MPAA | RATING | | |
|---|---|---|---|
| X | X | ▲▼ : | MOVE CURSOR |
| NC-17 | X | ◀▶ : | CHANGE STATUS |
| R | X | ■ : | PREVIOUS MENU |
| PG-13 | X | X : | BLOCKED |
| PG | X | | |
| G | X | | |

64 —

HELP MESSEGE

FIG. 14

G  :  "GENERAL AUDIENCES – ALL AGES ADMITTED"
PG :  "PARENTAL GUIDANCE SUGGESTED"
PG-13: "INAPPROPRIATE FOR CHILDREN UNDER 13"
R  :  "RESTRICTED, UNDER 17"
      "REQUIRES ACCOMPANYING PARENT OR ADULT GUARDIAN"
NC-17,X : "NO ONE 17 AND UNDER ADMITTED"

FIG. 15

```
SHORTEN KEY : X
         ID : X X X X
     RATING : TV-PG/MPAA

▲▼ : SELECT    0-9 : CODE    ■ : OK
```

FIG. 16

```
      PROGRAM RATING IS TV-PG-VSLD

TV-PG : PARENTAL GUIDANCE SUGGESTED
    V : INTENSE VIOLENSE
    S : SOME SEXUAL SITUATIONS
    L : INFREQUENT COARSE LANGUAGE
    D : SOME SUGGESTIVE DIALOGUE

ENTER YOUR ACCESS CODE : _____
OR SHORTEN KEY : _____
```

METHOD FOR CHANGING A RATING CODE WITH A MACRO FUNCTION KEY AND RECEIVING APPARATUS HAVING A FUNCTION FOR BLOCKING OUT A PROGRAM

BACKGROUND OF THE INVENTION

1. Field of the Invention

The present invention relates to a method for changing a rating code with a macro function key and a receiving apparatus having a function for blocking out a program which can easily change a preset rating code for blocking out the program with the macro to function key.

2. Description of the Prior Art

As children and youngsters increasingly imitate misbehavior and violence learnt from television programs or films and some of them in fact commit crimes, many parents have worried about these phenomena. Whereas a rating system for films has prevented young viewers from watching improper ones, there has been no effective system for television programs.

In the United States, thanks to a recently passed federal regulation, every television set must adopt a discretionary control feature, that is more commonly called a "V-chip" function, that blocks out the outputs of video and audio programs when parents classify a program as improper for their children. Under the regulation, television sets sold in the U.S. market must contain this function by Jan. 1, 2000 (effective as from Jan. 1, 2000).

Various prior arts relating to a discretionary control feature, that is a "V-chip" function, are disclosed in U.S. Pat. Nos. 4,554,584; 4,605,964; 4,888,796; 4,930,158; 4,930,160; 5,172,111; 5,195,135; 5,270,822; 5,387,942; 5,485,518; 5,550,575; 5,583,576; 5,569,366; and 5,737,479.

The blocking-out operation for a television program is carried out as follows. A broadcasting station transmits a television signal including an encoded rating signal on line 21 of the 525 horizontal lines. A receiving circuit of a television set extracts and decodes the encoded rating signal on horizontal line 21, to check whether a rating of the decoded program is within or not within a scope of a preset rating by users, or parents. When the program rating is not within the scope of the preset rating, the outputs of video, audio and text data are blocked out, so that the program can not be viewed. On the contrary, when the program rating is within the scope of the preset rating, the program is allowed to be viewed.

In the system with the "V-chip" function, it takes two or three seconds just after the channel change for decoding the rating code from the received television signal of a changed channel and for initiating the blocking-out operation. By repetitively changing the channel, the viewer can watch any television program since the television program of each of switched channels whose rating is not within the scope of the preset rating cannot be blocked out for two or three seconds and the viewer can view the television program of each channel. To get rid of this blank just after the channel change in the blocking-out operation, it is worth adopting a method which unconditionally blocks out the output of the television program till the rating signal is perfectly decoded. However, this method has a problem that blocks out television program even within the scope of the preset rating.

However, to achieve the above described blocking out function, the user has to set the rating code. Accordingly, there is an inconvenience that the user has to select a rating code control mode, input password, and control the rating code with reference to a rating code guide whenever the user changes the rating code.

SUMMARY OF THE INVENTION

Therefore, it is an object of the present invention to provide a method for changing a rating code with a macro function key capable of easily changing a preset rating code, by which the macro function key of a frequently used rating code is preset and the preset macro function key is used when the rating code is changed.

It is another object of the present invention to provide a receiving apparatus having a function for blocking out a program capable of easily changing a preset rating code, by which the macro function key of a frequently used rating code is preset and the preset macro function key is used when the rating code is changed.

In order to achieve the above objects, the present invention provides a method for changing a rating code with a macro function key, which comprises the steps of:

(i) registering a macro function key;

(ii) reading out a rating code corresponding to the registered macro function key;

(iii) comparing a preset rating code with the read out rating code;

(iv) changing the preset rating code of the macro function key into the read out rating code when the read out rating code is not out of scope of the preset rating code;

(v) requesting a user's identification when the read out rating code is out of scope of the preset rating code;

(vi) comparing the inputted identification with a pre-registered identification; and (vii) changing the preset rating code into the read out rating code when the inputted identification is identical with the pre-registered identification.

In order to achieve the above objects, the present invention provides a receiving apparatus having a function for blocking out a program, which comprises:

a receiving section for receiving a broadcast signal from a selected channel to output a video signal and an audio signal;

an audio circuit section for processing the audio signal from said receiving section to output a sound;

a video circuit section for processing the video signal from said receiving section to output a video;

a decoder for reading out a program rating signal from the video signal and for decoding the read out program rating signal to output a rating code;

a command inputting section for setting a macro function key and/or the rating code and for executing an input of a password and/or the macro function key;

a memory for storing a rating code information and a user's identification corresponding to the macro function key; and a control section for recording the rating code information and the user's identification corresponding to the macro function key inputted through said command inputting section, for reading out a rating code corresponding to a registered macro function key from said memory, for comparing a preset rating code with the read out rating code, for changing the preset rating code of the macro function key into the read out rating when the read out rating code is not out of scope of the preset rating code, for requesting the user's identification when the read out rating code is out of scope of the preset rating code, for comparing the inputted identification with a pre-registered identification, and for changing the preset rating code of the macro function key into the read out rating code when the inputted identification is identical with the pre-registered identification.

In the method for changing a rating code with a macro function key and the receiving apparatus having a function for blocking out a program according to the present invention, the user can easily change the blocking out rating code with the macro function key. As a result, it is very convenient to use because it settles the troubles and inconveniences relating to the rating code change and control of the receiving apparatus.

Also, since users have to input their identification to change the preset rating code into other rating codes which are out of scope of the preset rating code, secrecy over of the rating code for blocking out the program can be maintained.

BRIEF DESCRIPTION OF THE DRAWINGS

The above objects and other advantages of the present invention will become more apparent by describing in detail a preferred embodiment thereof with reference to the attached drawings, in which.

DESCRIPTION OF THE PREFERRED EMBODIMENT

A description will be given below in detail with reference to the accompanying drawings to a configuration and an operation of a method for changing a rating code with a macro function key and a receiving apparatus having a function for blocking out a program according to an embodiment of the present invention.

Figure 1:
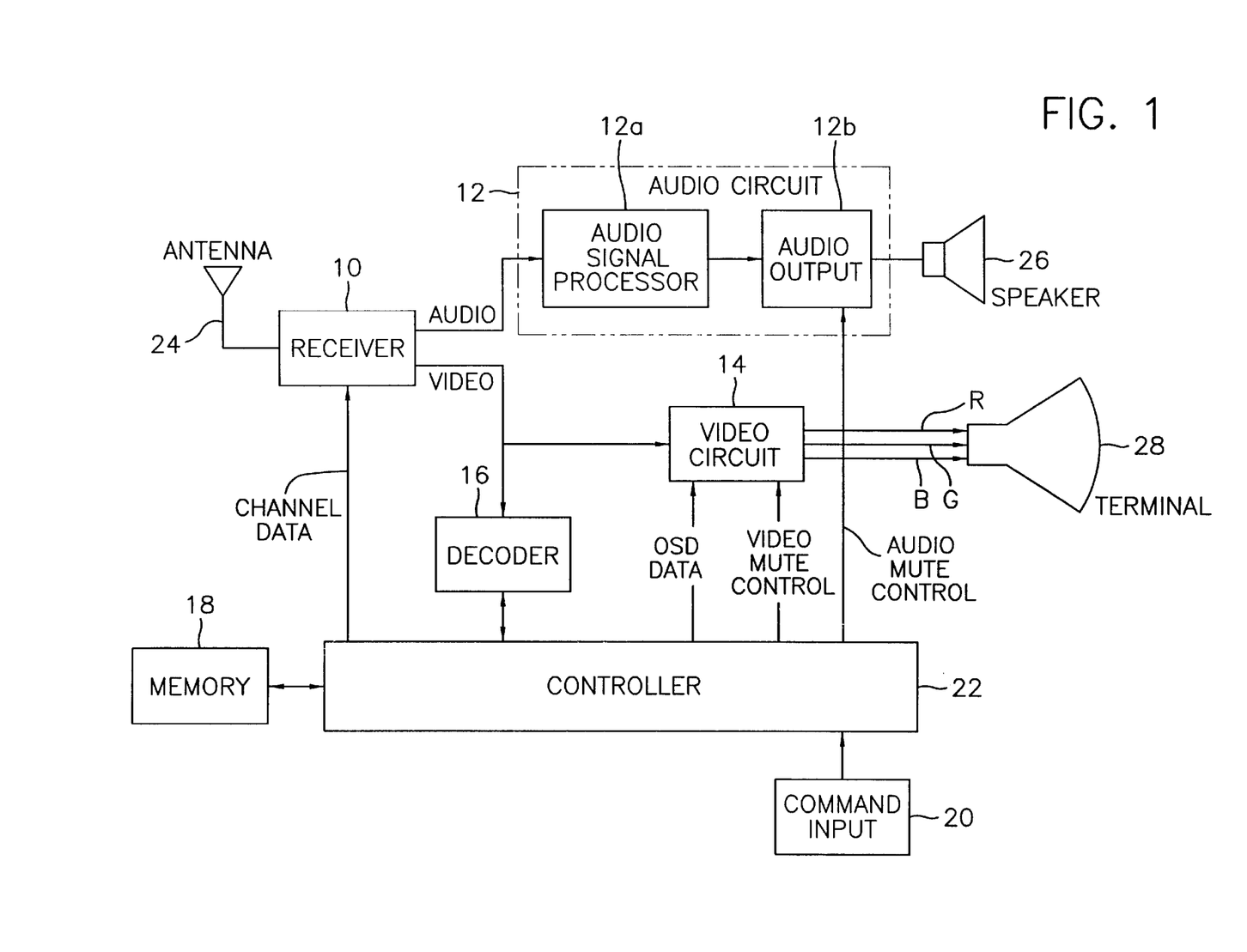
FIG. 1 is a block diagram for showing a circuit configuration of a receiving apparatus having a function for blocking out a program according to an embodiment of the present invention.

FIG. 1 is a block diagram for showing a circuit diagram of a receiving apparatus having a function for blocking out a program according to an embodiment of the present invention. Referring to FIG. 1, the receiving apparatus has a receiving section 10, an audio circuit section 12, a video circuit section 14, a decoder 16, a memory 18, a command inputting section 20, and a control section 22.

Receiving section 10, based on tuning data provided from the controller 22, selects one channel from high frequency multiple channels received through an antenna 24. After detecting an intermediate frequency of a television signal of the selected channel, the television signal is separated into a video signal and an audio signal.

Receiving the audio signal, an audio processing section 12A, which is a pre-processor of the audio circuit section 12, processes the audio signal. The processed audio signal is amplified by an audio outputting section 12B, and is outputted through a speaker system as a sound. Audio circuit section 12 mutes the sound output in response to an audio mute control signal from control section 22.

Video circuit section 14 divides the video signal into a color signal, a luminance signal, and a synchronous signal, processes the divided video, color and luminance signals respectively, and synthesizes the processed color signal and the luminance signal. The synthesized signal is provided to cathode-ray tube ((hereinafter, referred to as CRT) 28 as a red-green-blue signal (hereinafter, referred to as R-G-B signal). Video circuit section 14 mixes an on-screen-display (hereinafter, referred to as OSD) data from control section 22 and the R-G-B signal.

Command inputting section 20 has a remote controller and a remote control receiving section (not shown), receives a remote control key signal which is generated by a user's operation, and provides the received remote control key signal to control section 22. The user sets a rating code and a macro function key with the remote controller, and inputs the macro function key and a password with the remote controller.

Memory 18 consists of a random access memory or a non-volatile memory, and stores the password and the rating code.

Figure 2:
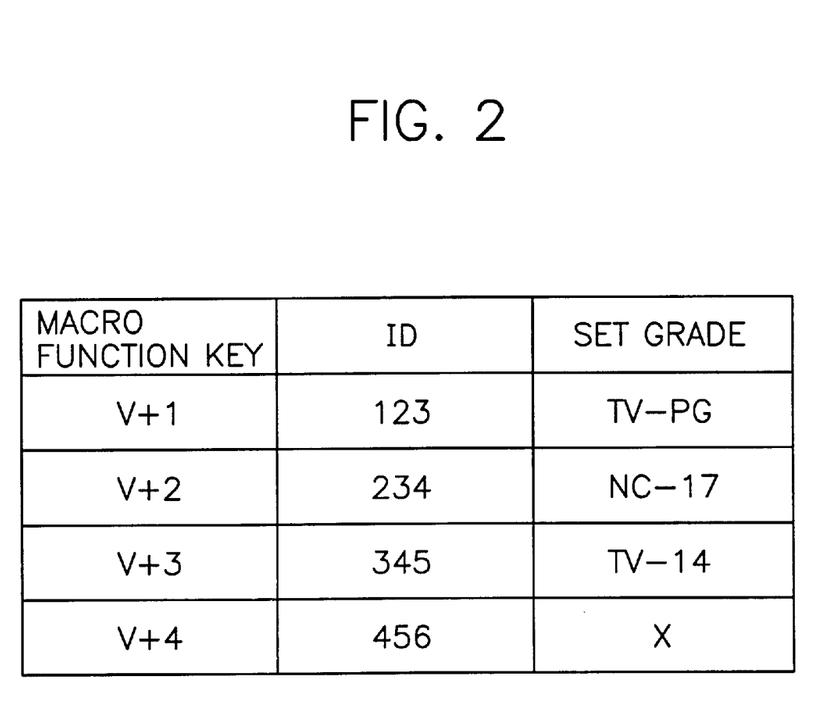
FIG. 2 is a memory mapping view for showing registration information of a macro function key of the receiving apparatus having a function for blocking out a program according to an embodiment of the present invention.

FIG. 2 is a memory map showing registration information of the macro function key of the receiving apparatus which has a function for blocking out a program, according to an embodiment of the present invention. Memory 18 has a user's identification and a rating code information corresponding to the respective macro function keys.

Control section 22 has a micro-computer to control the operation of the respective elements of the receiving apparatus.

Figure 3:
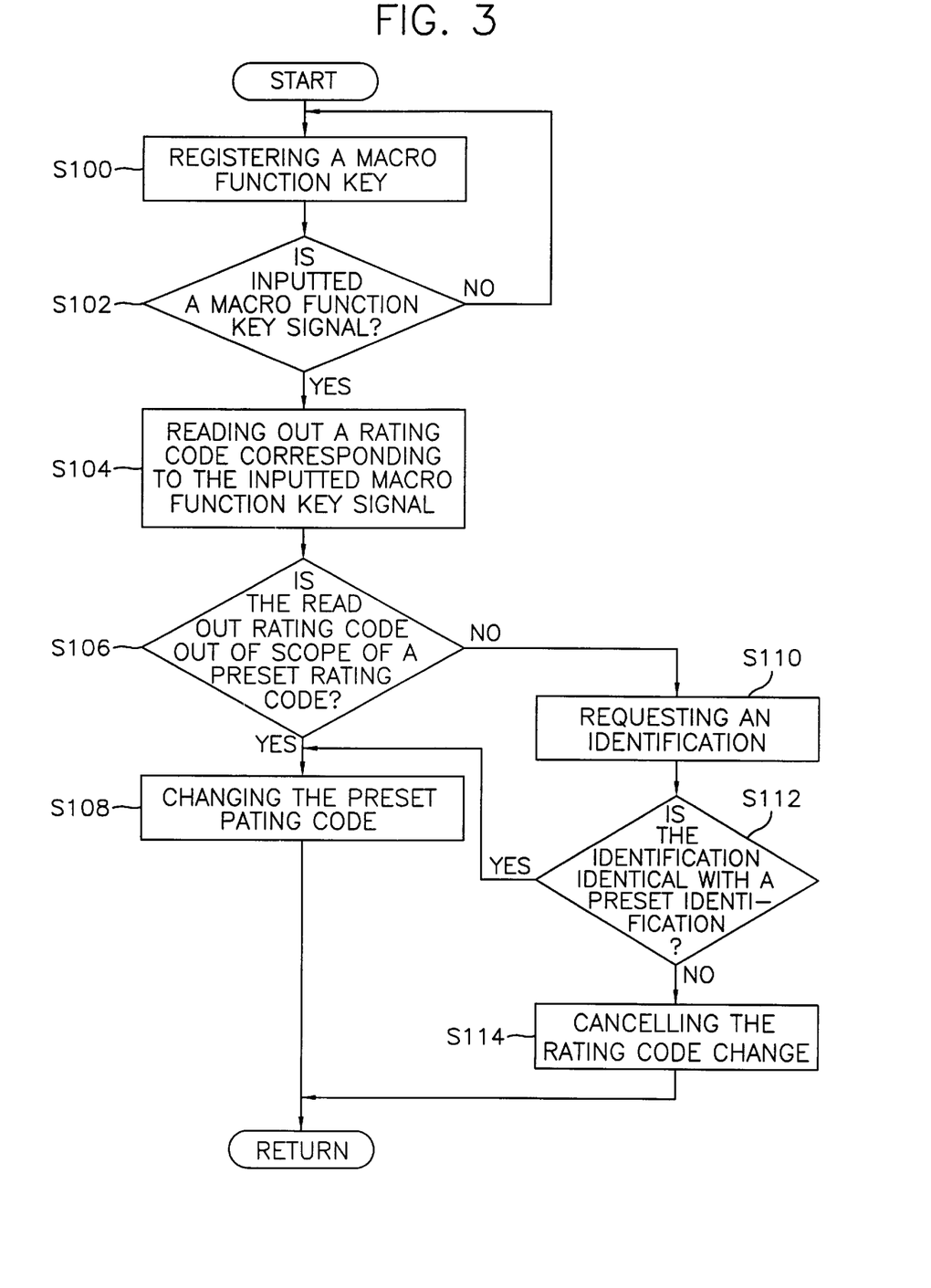
FIG. 3 is a flowchart for illustrating a method for changing a rating code with a macro function key according to an embodiment of the present invention.

FIG. 3 is a flowchart for illustrating a method for changing a rating code with a macro function key according to an embodiment of the present invention.

The user executes the setting and the registering of the macro function key using the remote controller to register macro function key information as shown in FIG. 2 (step S100). In a status where the macro function key is set, control section 22 checks whether or not the macro function key signal is inputted (step S102).

When the macro function key signal is inputted, control section 22 reads out a rating code from memory 18 corresponding to the inputted macro function key signal (step S104).

Control section 22 compares the read out rating code with a preset rating code (step S106). If the read out rating code is not out of scope of the preset rating code, control section 22 changes the preset rating code of the macro function key into the read out rating code (step S108). In this case, since a range of the rating code for blocking out a program is extended, the confirmation of the user's identification is not necessary.

In step S106, if the read out rating code is out of scope of the preset rating code, control section 22 outputs a message which requests the user's identification through an OSD (step S110). In this case, since the range of the rating code for blocking out the program is reduced, control section 22 requests the user's identification.

When the user inputs the identification, control section 22 checks whether or not the inputted identification is identical with the identification which is registered in the macro function key (step S112). If the inputted identification is identical with the registered identification, control section 22 executes step S108 to change the rating code. If the inputted identification is not identical with the registered identification, control section 22 cancels the change of the rating code (step S114), and proceeds with the next step.

Figure 4:
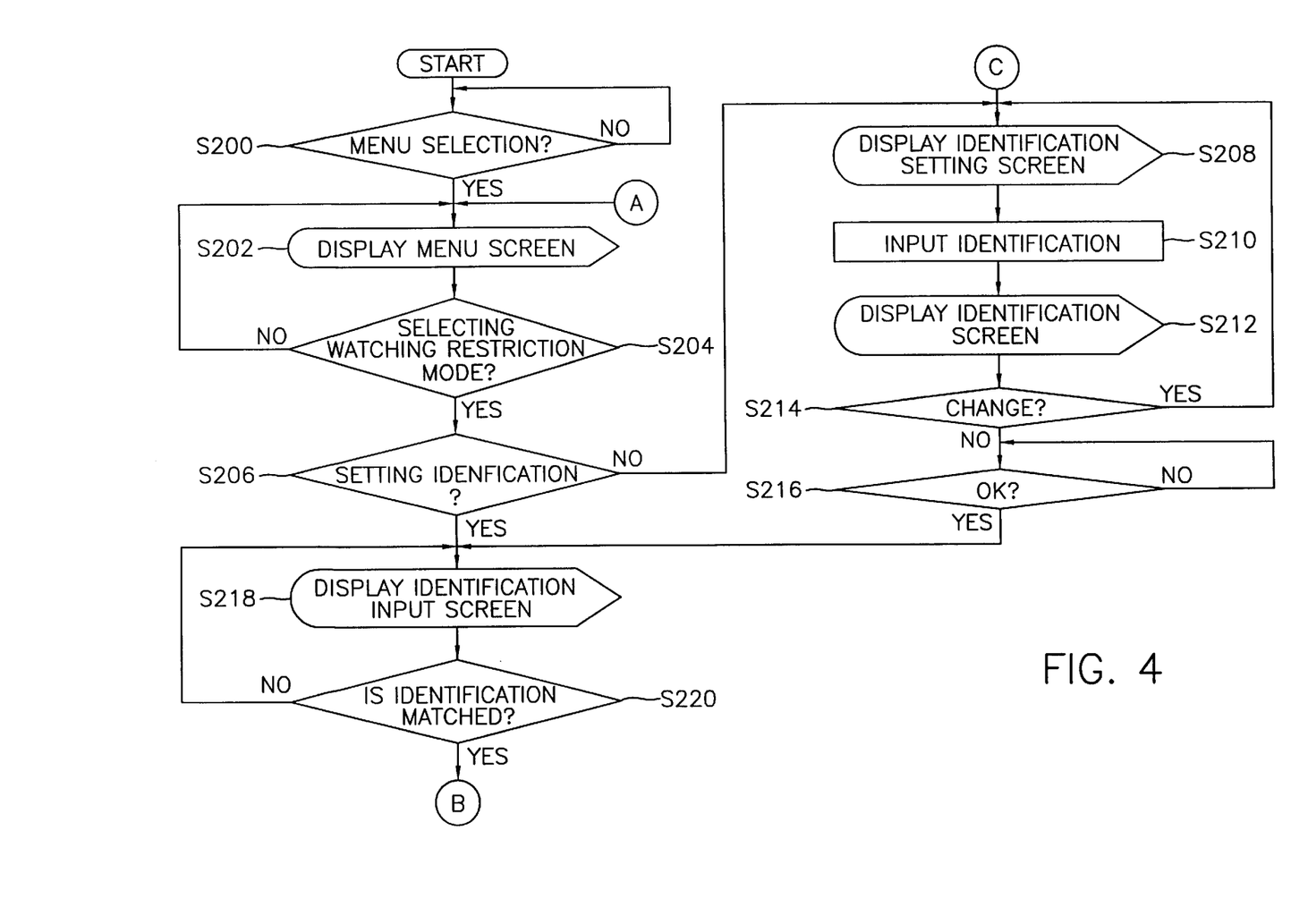
FIG. 4 to 5 are a flowchart for illustrating a method for setting a rating code of a method having a function for blocking out a program according to an embodiment of the present invention.
Figure 5:
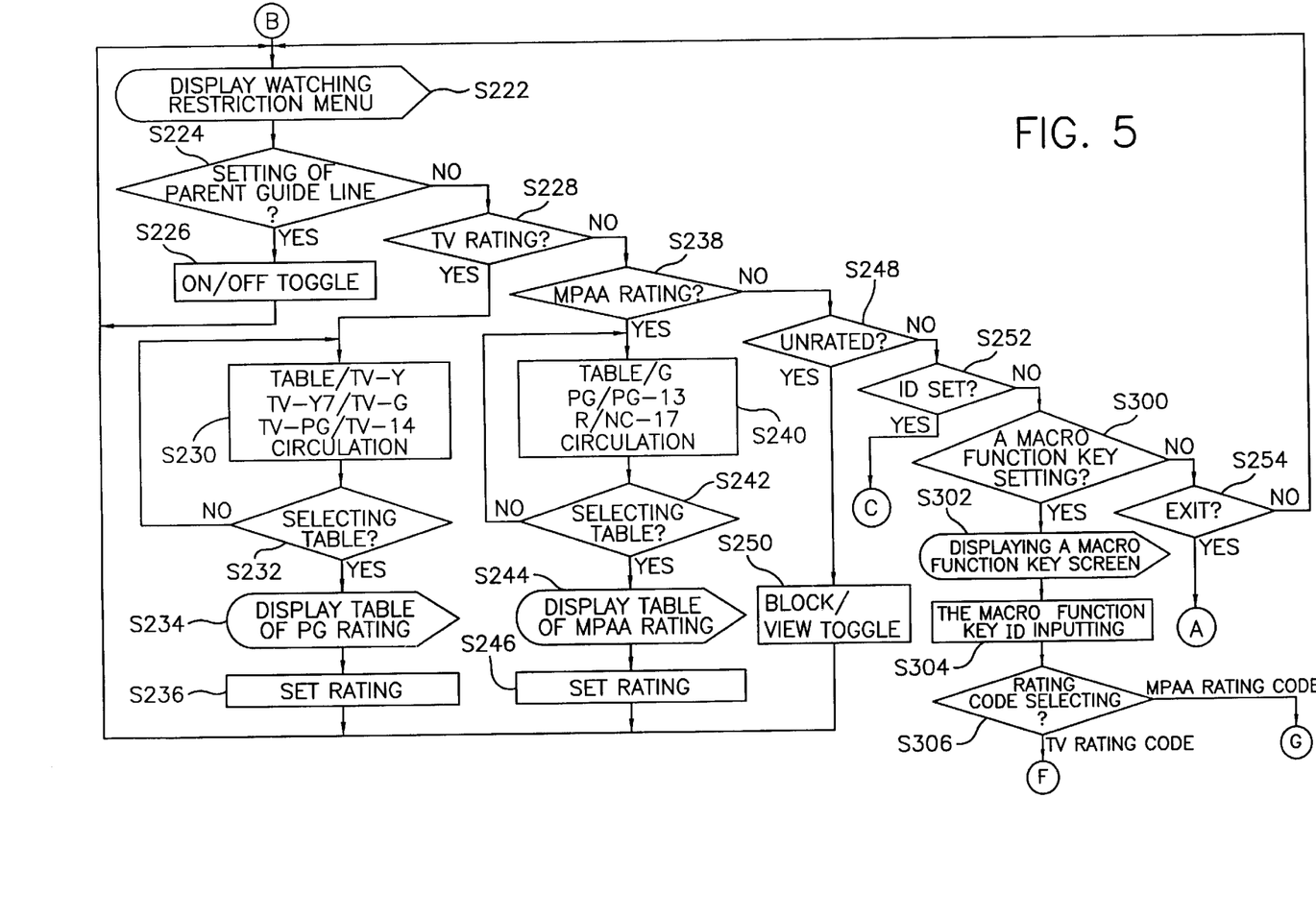

FIGS. 4 and 5 are flowcharts illustrating a rating code setting process by the receiving apparatus which has a function for blocking out a program, according to an embodiment of the present invention.

Figure 6:
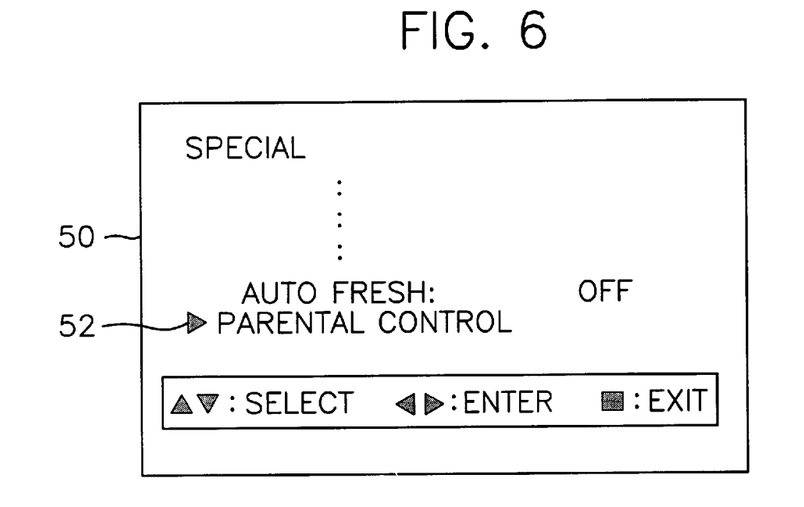
FIG. 6 to 16 are views for showing a status of a display screen.

Referring to FIG. 4, when the user selects a menu with the remote controller (step S200), control section 22 provides the OSD data to video circuit section 14 to display a menu screen shown in FIG. 6 on CRT screen 28 (step S202).

When the user moves a cursor up and down on the OSD screen 50 to select a parental control, and finishes registering the rating code by using left-right moving key provided in the remote controller, a parental control is selected (step S204).

Figure 7:
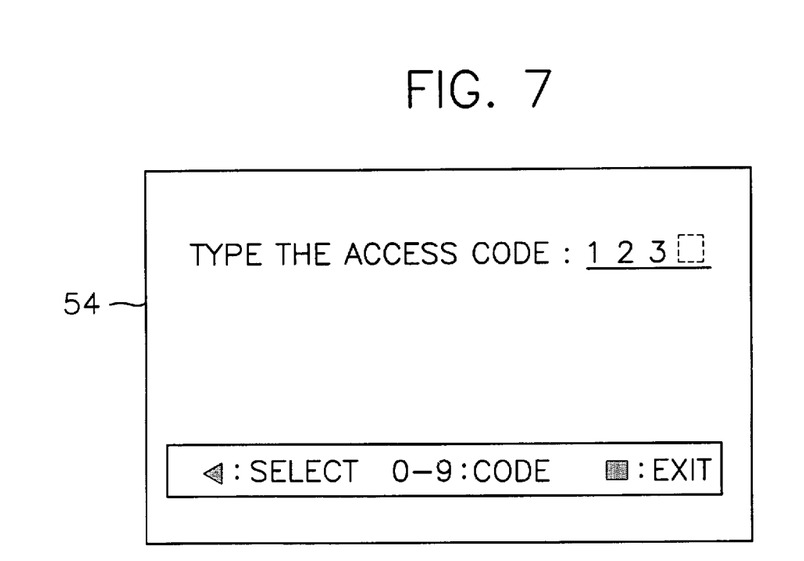
Figure 8:
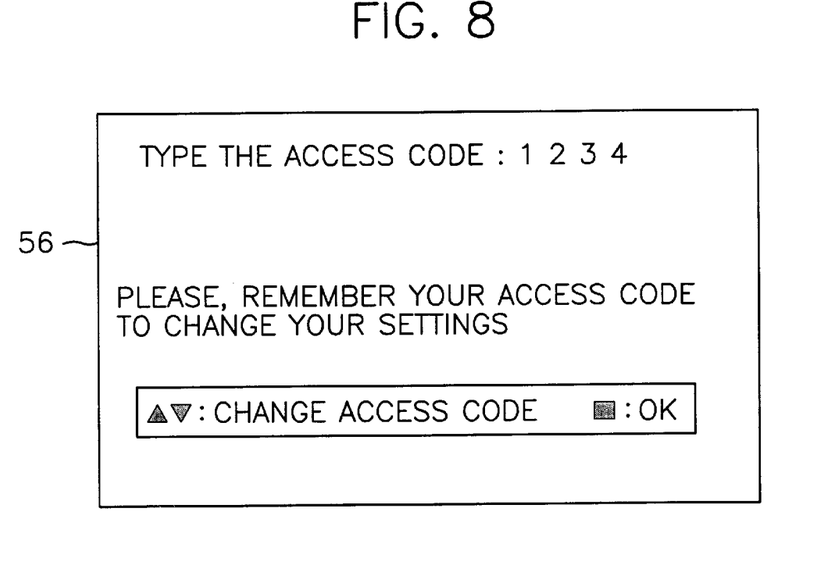

Control section 22 checks whether or not the user's password, that is, the identification is set (step S206). If the identification is not set, control section 22 displays an identification setting screen shown in FIG. 7 on the CRT (step S208).

The user selects 4 digits from 0 to 9 by moving the cursor to input the identification (step S210). When the identification of four digits is inputted, control section 22 displays an identification screen 56 shown in FIG. 7 (step S212).

When the user presses the up-down moving key, control section 22 recognizes the change of the identification (step S214) and executes step S208. In step S212, when the user selects OK (step S216), control section 22 registers the inputted four digits as the identification. In a case either where the identification was set in step S206 or where a new identification was set in step S216, control section 22 displays an identification inputting screen 58 shown in FIG. 9 on the CRT (step S218).

Figure 9:
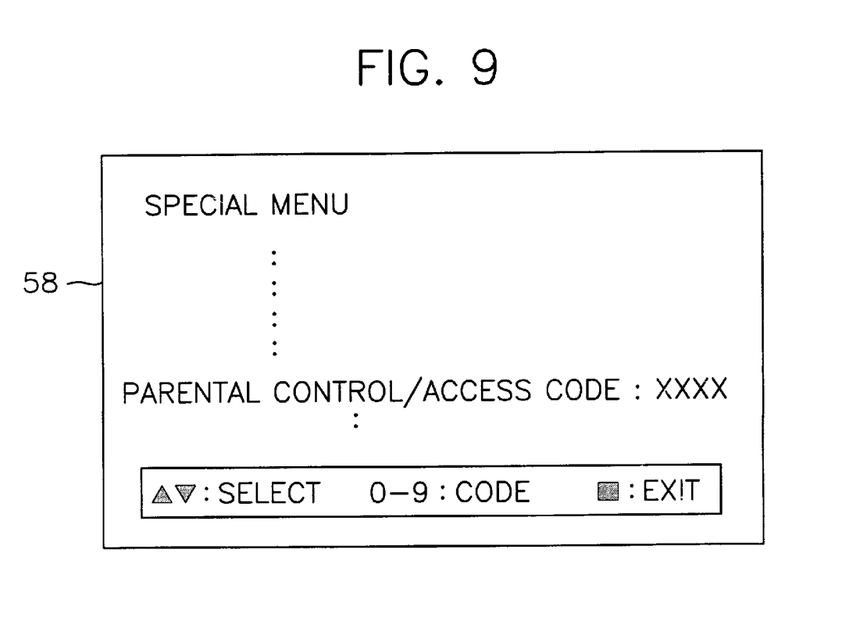

When the user inputs the identification on the identification inputting screen 58, control section 22 compares a preset identification with the inputted identification (step S220). If the preset identification is not identical with the inputted identification, control section 22 displays a watching restriction menu screen 60 shown in FIG. 10 on the CRT.

Figure 10:
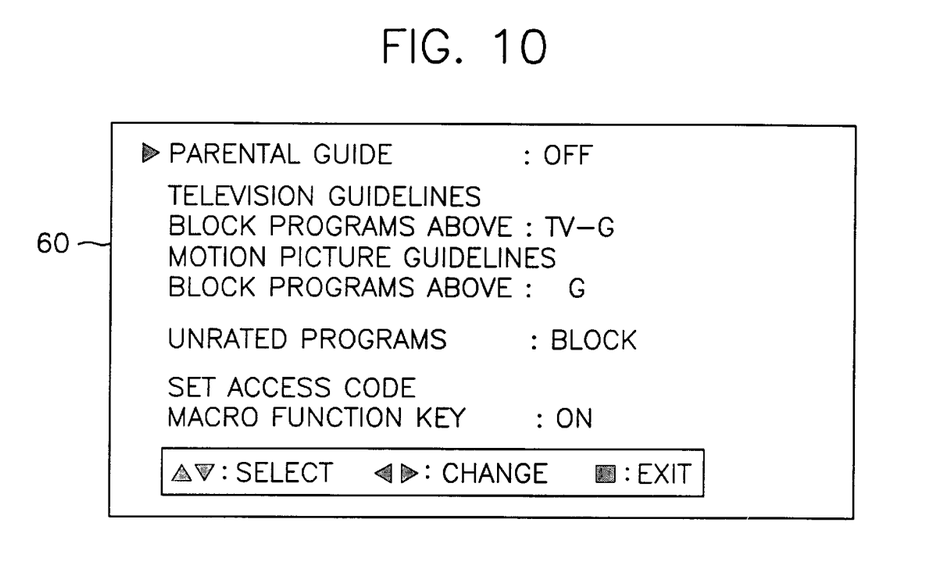

The user can set functions on the watching restriction menu screen 60 as described below.

1. PARENTAL GUIDE
2. TELEVISION GUIDELINES BLOCK PROGRAMS ABOVE
3. MOTION PICTURE GUIDELINES BLOCK PROGRAMS ABOVE
4. UNRATED PROGRAMS
5. SET ACCESS CODE
6. MACRO FUNCTION KEY

The user can select the respective item by moving the cursor in the watching restriction menu screen 60 and can change the contents of the respective item by pressing the left-right moving key.

Control section 22 checks whether or not the parental guide is selected (step S224), and the parental guide is set by ON/OFF toggle according to the key operation of the user (step S226). When the user turns on the parental guide, control section 22 executes an operation for blocking out the program according to the set rating codeWhen the user turns off the parental guide, control section 22 disregards the operation for blocking out the program.

Ratings of the television guidelines menu are classified according to age and television program's contents. Control section 22 checks whether or not the television guidelines menu is selected (step S228). If the television guidelines menu is selected, the user can select one rating from the following ratings: TABLE, TV-Y, TV-Y7, TV-G, TV-PG and TV-14, while circulating through these ratings (step S230).

Figure 11:
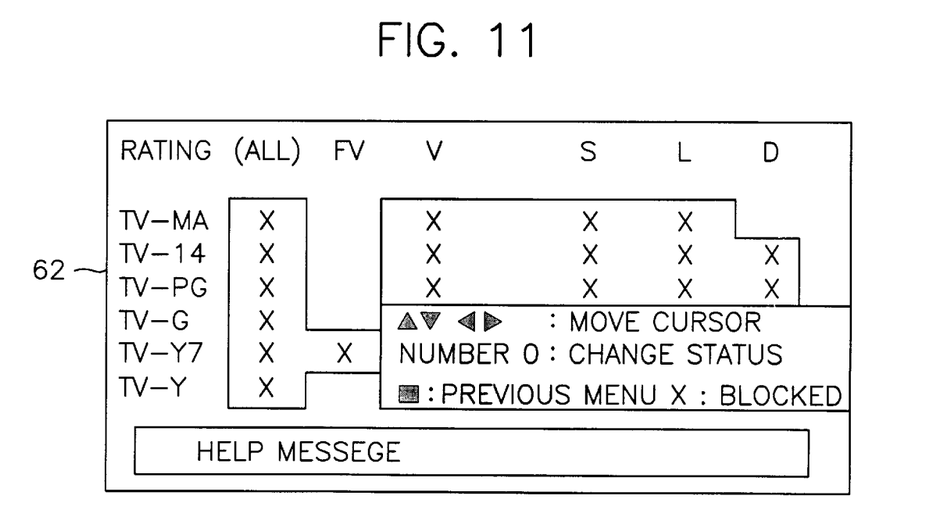
Figure 12:
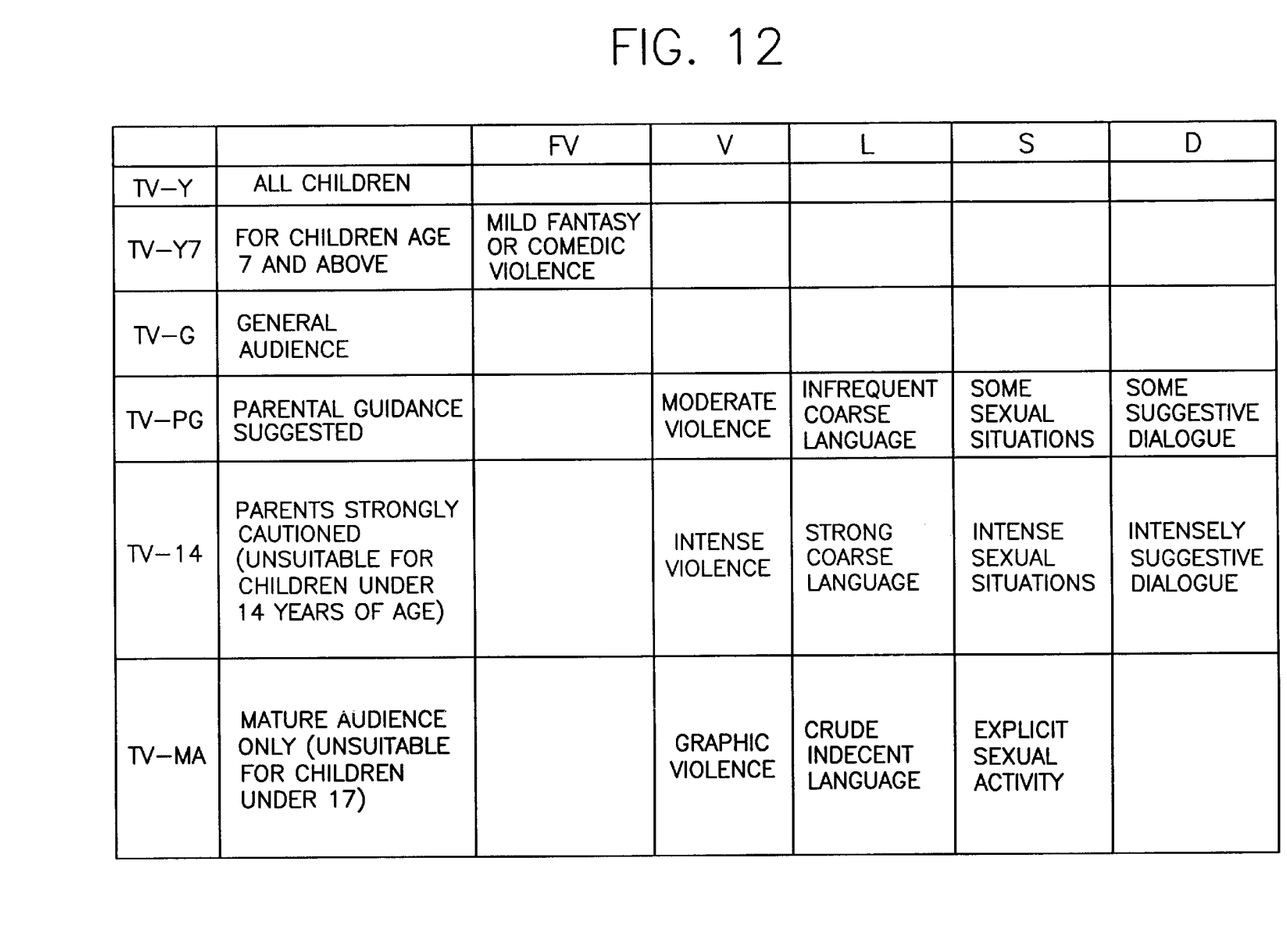

When the table is selected in step S230 (step S232), a table menu screen 62 shown in FIG. 11 is displayed on the CRT (step S234). A vertical axis of the table indicates the rating code according to the age of the viewers and a horizontal axis of the table indicates the rating code according to the contents of the program. When the user sets one rating code on the table using the cursor (step S236), the rating code on which the cursor is placed is set. At this time, the program rating which is out of scope of the program rating set by the user is blocked out automatically. When the help message at bottom of the table menu screen 62 is selected by the user, the television guidelines message shown in FIG. 12 is displayed on the screen.

The motion picture guidelines classifies the ratings of movies according to the viewer's age. Control section 22 checks whether or not the motion picture guidelines is selected (step S238). If the motion picture guidelines is selected, then the user can select one rating from the following ratings: TABLE, X, NC-17, R, PG-13, PG and G, while circulating through these ratings (step S240).

Figure 13:
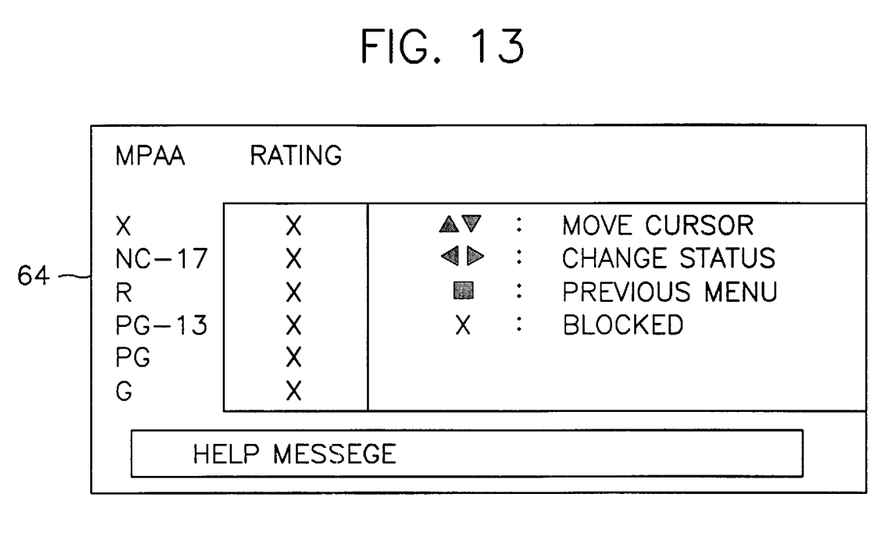
Figure 14:
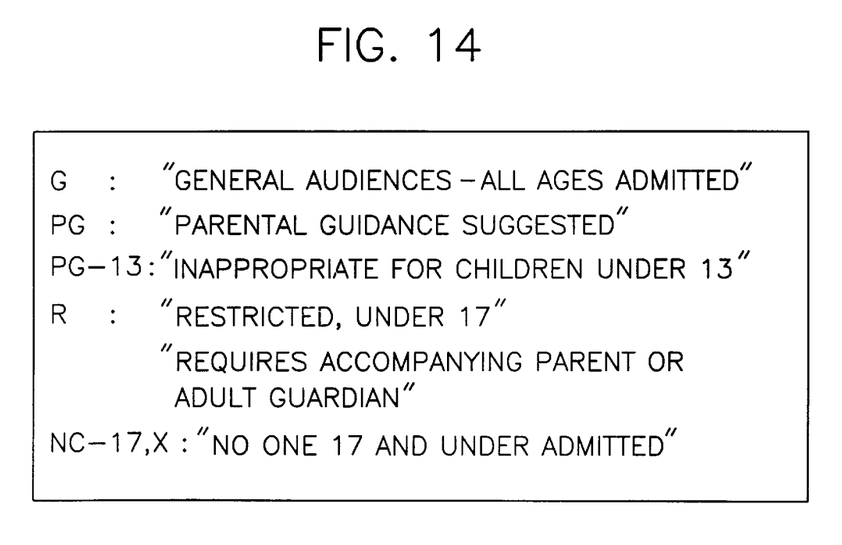

When the table is selected in step S240 (step S242), a table menu screen 64 shown in FIG. 13 is displayed on the CRT (step S244). A vertical axis of the table indicates the rating code according to the age. When the user sets one rating code on the table by using the cursor (step S246), the rating code corresponding to the cursor is set. At this time, the program rating which is out of scope of the program rating set by the user is blocked out automatically. When the help message at bottom of the table menu screen 64 is selected by the user, the motion picture guidelines message shown in FIG. 14 is displayed on the screen.

When the unrated programs is selected from the watching restriction menu screen 60 of step S222 (step S248), a message which indicates either blocking out or non-blocking out is displayed on the screen (step S250). As shown in FIG. 10, the status displayed on the screen indicates the blocking out or non-blocking out of the unrated programs. When the user selects the set access code from the watching restriction menu screen 60 (step S252), control section 22 executes step S208.

Figure 15:
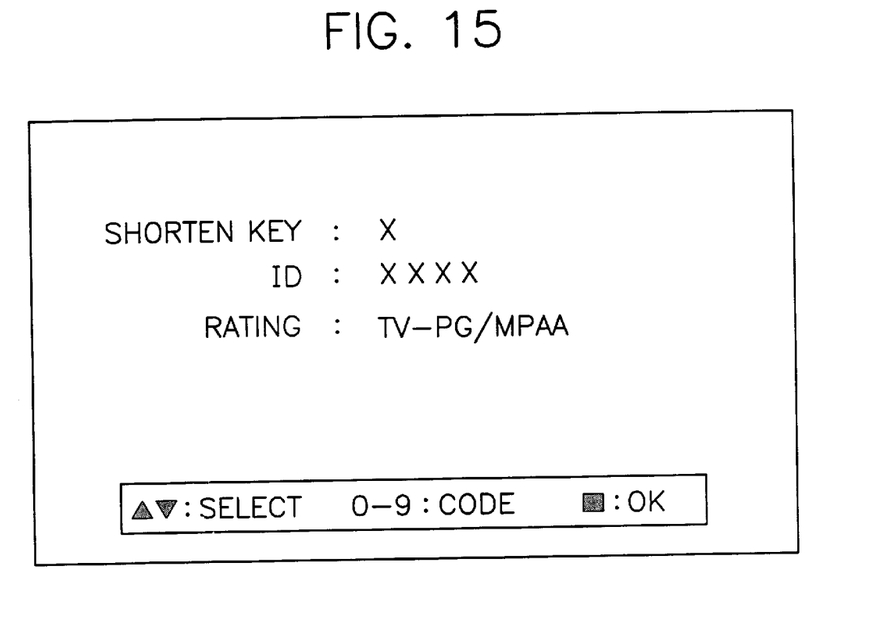
Figure 16:
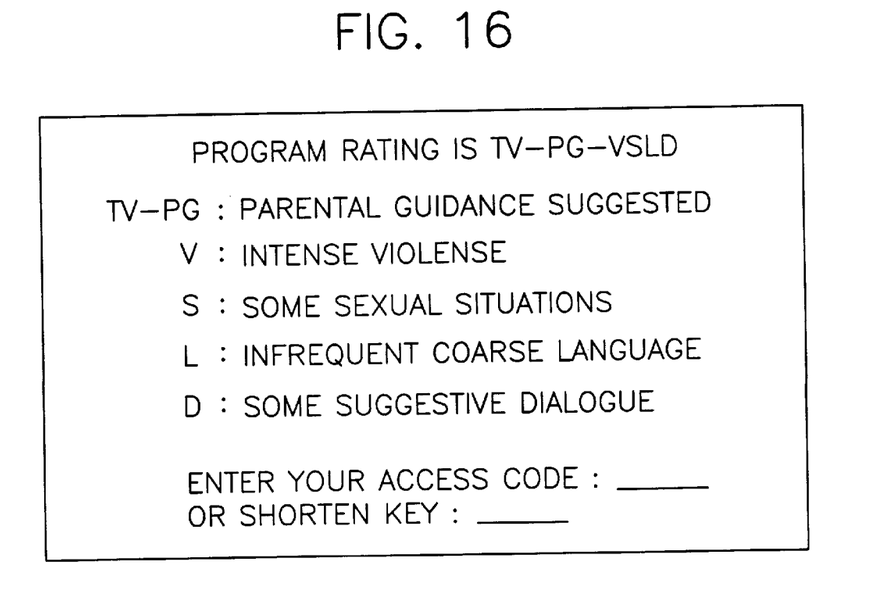

When the macro flnction key is selected from the watching restriction menu screen 60 (step S300), an ON or OFF status which indicates the set status of the macro function key is displayed on the screen. If the set status of the macro function key is the ON status, as shown in FIG. 15, a screen for setting the macro function key is displayed on the screen (step S302). When the user inputs the macro function key composed of the function code and the number code, inputs the identification (step S304), and selects the rating code, the TV-PG rating code and the MPAA rating code are displayed. If the user selects rating codes for the TV-PG rating code and the MPAA rating code from the screen (step S306), procedures for setting the selected rating codes are proceeded. When the TV-PG rating code is selected in step S306, control section 22 executes step S230. When the MPAA rating code is selected, control section 22 executes step S240. When the EXIT is selected (step S254), control section 22 returns to step S202 to display the menu screen.

As described above, in the status where the rating code is set, if the rating code of the received program is out of scope of the preset rating code, control section 22 blocks out the video and audio outputs. At this time, the blocking status is displayed on the OSD screen shown in FIG. 15. On the blocking screen, the contents of the set rating code are shown as caption. In order to release the blocking status, the user has to modify the rating code in the watching restriction menu screen either by pressing the set macro function key or by inputting the identification.

As known from the above, the macro function key can give the user convenience in setting the blocking-out rating code and in controlling the receiving apparatus. Also, since the user has to input the user's identification in order to change the preset rating code into other rating codes which are not within the scope of the preset rating code, secrecy over the rating code for blocking out the program can be maintained.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A method for changing a rating code with a macro function key, said method comprising the steps of:
   (i) registering a macro function key;
   (ii) reading out a rating code corresponding to the registered macro function key;
   (iii) comparing a preset rating code with the read out rating code;
   (iv) changing the preset rating code of the macro function key into the read out rating code when the read out rating code is not out of scope of the preset rating code;
   (v) requesting a user's identification when the read out rating code is out scope of the preset rating code;
   (vi) comparing the inputted identification with a pre-registered identification; and
   (vii) changing the preset rating code into the read out rating code when the inputted identification is identical with the pre-registered identification.

2. The method as claimed in claim 1, wherein said step (i) comprises the substeps of:
   (i-1) selecting a macro function key mode;
   (i-2) displaying a screen for setting the macro function key; and
   (i-3) setting the macro function key, the identification and the rating code on the screen for setting the macro function key.

3. The method as claimed in claim 1, wherein the rating code of the macro function key consists of a function code and a number code.

4. The method as claimed in claim 2, wherein the respective macro function keys are different from each other.

5. A receiving apparatus having a function for blocking out a program, said apparatus comprising:

a receiving section for receiving a broadcast signal from a selected channel to output a video signal and an audio signal;

an audio circuit section for processing the audio signal from said receiving section to output a sound;

a video circuit section for processing the video signal from said receiving section to output a video;

a decoder for reading out a program rating signal from the video signal and for decoding the read out program rating signal to output a rating code;

a command inputting section for setting a macro function key and/or the rating code and for executing an input of a password and/or the macro function key;

a memory for storing a rating code information and a user's identification corresponding to the macro function key; and a control section for recording the rating code information and the user's identification corresponding to the macro function key inputted through said command inputting section, for reading out a rating code corresponding to a registered macro function key from said memory, for comparing a preset rating code with the read out rating code, for changing the preset rating code of the macro function key into the read out rating when the read out rating code is not out of scope of the preset rating code, for requesting the user's identification when the read out rating code is out of scope of the preset rating code, for comparing the inputted identification with a pre-registered identification, and for changing the preset rating code of the macro function key into the read out rating code when the inputted identification is identical with the pre-registered identification.

* * * * *